though the latter is claimed under the other copending application referred to above.

United States Patent Office
3,061,545
Patented Oct. 30, 1962

3,061,545
SILICONE LUBRICATING COMPOSITIONS
William H. Badger, Midland, Mich., assignor to Dow Corning Corporation, Midland, Mich., a corporation of Michigan
No Drawing. Filed June 9, 1958, Ser. No. 740,518
2 Claims. (Cl. 252—49.6)

This invention relates to compositions containing fluorinated polysiloxanes and having resistance to both water and organic solvents and which have mechanical stability.

Thus far lubricants, especially organic lubricants, having the best resistance to organic solvents have had poor resistance to water. Similarly, lubricants such as the now well-known silicones having excellent water resistance have had almost no resistance to some organic solvents. A real problem arises when it is necessary to lubricate a valve or seal a joint which is exposed to some combination of water and a solvent such as mixtures of the two or a stream of one having the other present as an impurity, e.g. "wet" benzene. When such materials are dealt with, presently known commercial greases fail. There is also a problem where, for instance, a valve or joint is exposed alternately to an organic solvent and water. It is presently necessary in such circumstances to change the grease in the valve or joint depending upon the system involved.

It is an object of this invention, therefore, to produce a grease-type material which is resistant to, i.e. insoluble in, both water and organic solvents but which at the same time has good lubricating properties and good mechanical stability.

This invention relates to a composition of matter comprising (A) a continuous phase consisting essentially of an organopolysiloxane (1) which has a viscosity of from 50 cs. to 100,000 cs. at 25° C. and in which essentially all of the units have the formula $$\text{RCH}_2\text{CH}_2\overset{\text{R}'}{\underset{|}{\text{Si}}}\text{O}$$

in which each R is a perfluoroalkyl radical of from 1 to 10 inclusive carbon atoms and each R' is an aliphatic monovalent hydrocarbon radical of less than three carbon atoms and (B) dispersed in said continuous phase from 5 to 100 parts by weight per 100 parts of (1) of an organopolysiloxane (2) which is a fluid, incompatible with (1), having a viscosity of from 10 cs. to 100,000 cs. at 25° C. and in which essentially all the siloxane units are of the formula R"$_2$SiO in which each R" is a phenyl radical or lower alkyl radical.

As stated above, R can be any perfluoroalkyl radical of from 1 to 10 carbon atoms, e.g. $CF_3$—, $C_2F_5$—, $C_3F_7$—, and so on through $C_7F_{15}$— and $C_{10}F_{21}$—. R' can be any monovalent hydrocarbon radical of less than three carbon atoms, such as the methyl, ethyl and vinyl radicals. Consequently, examples of the units which can be components of siloxane (1) include

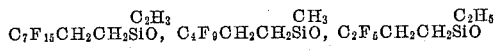

and

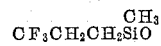

These siloxanes are generally produced from chlorosilanes which are produced from the reaction of fluorinated alkenes of the formula RCH=CH$_2$ with dichlorosilanes of the formula R'HSiCl$_2$ in the presence of a peroxide or platinum catalyst at temperatures of from 150° to 300° C. These chlorosilanes are then hydrolyzed in the conventional manner and the resulting hydrolyzate is then heated with an alkali metal hydroxide or an alkali metal salt of a siloxane under conditions which cause the corresponding cyclotrisiloxane to distill from the reaction mixture. The preparation and isolation of these cyclic trisiloxanes are more completely described in the copending application Serial No. 594,108, filed June 27, 1956, by Ogden R. Pierce and George W. Holbrook, now U.S. Patent 2,979,519, which application is assigned to the assignee of this invention.

The cyclic trisiloxanes are polymerized by heating in the presence of an alkaline catalyst, e.g. alkali metal hydroxide, quaternary ammonium hydroxide and siloxane salts of such hydroxides or in the presence of such common acid catalysts as sulfuric acid. The best method for this polymerization is more fully set out in the copending application Serial No. 594,107, now abandoned, filed June 27, 1956, by Oscar K. Johannson, which application is assigned to the assignee of this invention.

In the polymerization of the cyclic trisiloxanes, there may be present such materials as hexaorganodisiloxanes, octaorganotrisiloxanes, decaorganotetrasiloxanes and the like, which can supply to the fluorinated siloxane polymer endblocking units such as the corresponding triorganosiloxy, pentaorganodisiloxy and heptaorganotrisiloxy radicals. If these groups are not supplied, the resulting linear polymers will be hydroxy endblocked.

If endblocking groups are present in a polymerization system using the above-named acids or bases, the resulting product will be a mixture of fluorinated polymers endblocked with both organosiloxy units and hydroxyl groups. For this invention, however, the best fluid organopolysiloxanes (1) are produced by copolymerizing the cyclic trisiloxanes discussed above with low molecular weight siloxane fluids supplying organosiloxy endblocking units by employing as catalysts any of various fluoroalkyl sulfonic acids, e.g. $CF_3SO_3H$ or $HCF_2CF_2SO_3H$, in the place of the standard catalysts. This is more fully described in the copending application Serial No. 726,627, filed April 7, 1958, by Ogden R. Pierce and George W. Holbrook, now U.S. Patent 2,961,425 assigned to the assignee of this invention.

With this method for producing the organopolysiloxane (1) component of this invention a simple adjustment of the proportions of cyclic trisiloxane to the siloxane supplying endblocking units produces a polymer having any viscosity ranging from 50 cs. at 25° C. to 100,000 cs. at 25° C. by controlling the degree of polymerization, i.e. the number of units in the polymer.

The copending applications referred to above are incorporated into this specification by those references.

Siloxane (2) is incompatible with siloxane (1) and is made up essentially of units of the formula R"$_2$SiO in which R" can be the methyl, ethyl, propyl, butyl radical or any isomer thereof or the phenyl radical. Examples of such units are dimethylsiloxane units, phenylmethylsiloxane units, isobutylphenylsiloxane units, methylpropylsiloxane units and diethylsiloxane units. The production of such siloxane fluids by Grignard formation of the corresponding chlorosilanes, hydrolysis of the silanes and condensation of the silanols in the presence of acid or alkaline catalysts is now well-known in the art. These fluids can be endblocked generally with triogranosiloxy units in which the organic radicals are the same as those defined by R" above by equilibrating, i.e. heating in the presence of the above catalysts, the siloxane condensation products with low molecular weight linear siloxanes as described above, thereby introducing endblocking units into the siloxanes.

Either or both of siloxanes (1) and (2) can be mixtures or copolymers.

The compositions of this invention are obtained by mixing together the necessary components by any of the common means such as milling. Since they are most effective as "greases," the "grease" consistency can be accomplished by variation in the viscosities of the organopolysiloxane components (1) and (2) or by the addition of such finely divided powder thickeners as bentonite, carbon black, diatomaceous earth, silica aerogel, fume silica, silica xerogel and the like. When both siloxanes (1) and (2) are high viscosity materials, e.g. over 50,000 cs. at 25° C., or where siloxane (1), for instance, has a viscosity of 90,000 cs. at 25° C. and siloxane (2) having any viscosity between 10 cs. and 100,000 cs. at 25° C. is added in such amount that the viscosity of the combination is not less than, say, 50,000 cs. at 25° C., the composition does not need a thickener. Such compositions are somewhat tacky and are preferred for vacuum sealing greases. If, however, there is any need for thickener, it can be added. When the viscosity of the combination of siloxanes (1) and (2) is low, e.g. in the range of 300 cs. at 25° C., it is necessary to include a thickener to attain a grease consistency. For any combination it is preferred that the siloxane components be milled together and then thickener added until a grease of the desired consistency is produced.

While best results are obtained with untreated thickeners, thickeners which have been treated to render them hydrophobic as shown in U.S. Patent 2,610,167 and in the copending application Serial No. 160,100, filed May 4, 1950, by Leslie J. Tyler, now U.S. Patent 2,863,846, can also be employed.

The amount of thickener is not critical to this invention, but the practical limitation on the amount of fine-particle filler which acts as a grease thickener is no more than 15 parts by weight based on the total weight of the organopolysiloxanes. In general when thickeners are employed, they are used in amount of from 1 to 15 parts by weight of the grease.

In order for operative greases to be prepared the organopolysiloxane (1) must have a viscosity of at least 50 cs. at 25° C. while siloxane (2) must have a viscosity of at least 10 cs. at 25° C. Below these limits the composition will not form a satisfactory grease even with a thickener. As the viscosities increase, less thickener is needed and the stickier the composition gets. However, high vacuum apparatus requires tacky, i.e. nonrunning, compounds for lubricants. Consequently, fluids having viscosities up to 100,000 cs. at 25° C. are operative. Above this limit the "greases" are too stiff.

oBth organopolysiloxanes (1) and (2) must be present. If there is less than 5 parts by weight of (2) per 100 parts of (1), the composition has poor mechanical stability, e.g. it is thixotropic. If there is more than 100 parts of (2) per 100 parts of (1), the composition loses its solvent resistance.

The compositions of this invention can also contain such miscellaneous additives as pigments, other common fillers, e.g. metal oxides and organic materials, antioxidants and the like.

The compositions of this invention are useful as lubricants and sealants for such apparatus as stopcocks, plugcocks, ground glass joints and metal valves. They are resistant to heat, water and most organic solvents except acetone.

The following examples are illustrative and are not intended to limit the invention which is properly delineated in the claims.

*Example 1*

100 parts by weight of trimethylsiloxy-endblocked 3,3,3-trifluoropropylmethylpolysiloxane with a viscosity of 8000 cs. at 25° C., 25 parts by weight of a trimethylsiloxy-endblocked dimethylpolysiloxane with a viscosity of 1000 cs. at 25° C. and 9 parts by weights of a fume silica were thoroughly mixed on a standard three-roll mill so that the last two components were evenly dispersed throughout the first component.

This compound I was spread on several glass microscope slides which were immersed one in boiling perchloroethylene, one in boiling toluene, one in boiling n-hexane, one in boiling isopropanol, and one in boiling water. After 30 minutes the compound softened and expanded slightly when exposed to the organic solvents and was unaffected by the boiling water.

This experiment was repeated employing a commercial silicone stopcock grease which was removed from the slides by the boiling solvents in a few minutes.

When the dimethylpolysiloxane was omitted from compound I, both boiling perchloroethylene and boiling toluene partially removed the compound from the glass slides.

Compound I remained grease-like after being heated above 200° C. This material performs satisfactorily as a solvent- and water-resistant stopcock grease and as a lubricant for metal valves on benzene lines.

*Example 2*

The cover joint of a glass resin kettle containing perchloroethylene was sealed with compound I. The perchloroethylene was heated to reflux under a vacuum. No leaks in the seal were apparent after 15 minutes of this treatment.

This experiment was repeated with tolene instead of perchloroethylene, and the same results were obtained.

In each of the above experiments when a commercial silicone stopcock grease was substituted for compound I, the cover joint began to leak shortly after refluxing of each solvent began.

*Example 3*

When 60 parts of trimethylsiloxy-endblocked 3,3,3-trifluoropropylethylpolysiloxane having a viscosity of 60,000 cs. at 25° C., 40 parts by weight of phenyldimethylsiloxy-endblocked phenylmethylpolysiloxane fluid having a viscosity of 100 cs. at 25° C. and 12 parts by weight of silica aerogel are substituted for compound I in Example 1, a vacuum sealant having similar water and solvent resistance is produced.

*Example 4*

When any of the following fluids of the same viscosity are substituted for the trimethylsiloxy-endblocked 3,3,3-trifluoropropylmethylpolysiloxane of Example 1, similar excellent greases are produced:

Trimethylsiloxy-endblocked 3,3,4,4,4-pentafluorobutylvinylpolysiloxane.
A 1:1 mixture of phenyldimethylsiloxy-endblocked 2-(perfluoroheptyl)ethylmethylpolysiloxane and hydroxyendblocked-(perfluorobutyl)ethylmethylpolysiloxane.
A copolymer of 90 mol percent trifluoropropylmethylsiloxane units and 10 mol percent 3,3,4,4,5,5,5-heptafluoropentylmethylsiloxane units.

*Example 5*

When the trimethylsilxoy-endblocked dimethylpolysiloxane in Example 1 is replaced by any of the following fluids in the same amount and having the same viscosity, the greases obtained have the same excellent properties:

Hydroxy-endblocked isobutylphenylpolysiloxane.
A methylethylphenylsiloxy-endblocked copolymer of 50 mol percent diethylsiloxane units and 50 mol percent methylpropylsiloxane units.
A mixture of 50,000 cs. trimethylsiloxy-endblocked dimethylpolysiloxane and 30 cs. diphenylmethylsiloxy-endblocked phenylmethylpolysiloxane.

*Example 6*

When 10 parts by weight of trimethylsiloxy-endblocked dimethylpolysiloxane having a viscosity of 60,000 cs. at 25° C. and 100 parts by weight of hydroxy-endblocked 3,3,3-trifluoropropylmethylpolysiloxane having a viscosity of 80,000 cs. at 25° C. are mixed together on a three-roll mill, the resulting high-viscosity grease is an excellent water- and solvent-resistant vacuum sealing compound.

The same is true when 70 parts by weight more of the 60,000 cs. trimethylsiloxy-endblocked dimethylpolysiloxane are milled into the above composition.

That which is claimed is:

1. A lubricant consisting essentially of a continuous phase consisting of an organopolysiloxane (1) which has a viscosity of from 50 cs. to 100,000 cs. at 25° C. and in which essentially all the units have the formula

in which each R is a perfluoroalkyl radical of from 1 to 10 inclusive carbon atoms and each R' is an aliphatic monovalent hydrocarbon radical of less than three carbon atoms and dispersed in said continuous phase from 5 to 100 parts by weight per 100 parts of (1) of an organopolysiloxane (2) which is a fluid, incompatible with (1), having a viscosity of from 10 cs. to 100,000 cs. at 25° C. and in which essentially all the units have the formula $R''_2SiO$ in which each R'' is selected from the group consisting of the phenyl radical and alkyl radicals of less than five carbon atoms.

2. The lubricant composition of claim 1 thickened to a grease with up to 15 parts by weight of a finely-divided powder thickener per 100 parts by weight of the organopolysiloxane fluid mixture.

References Cited in the file of this patent

UNITED STATES PATENTS

| | | |
|---|---|---|
| 2,606,153 | Holdstock | Aug. 5, 1952 |
| 2,715,113 | Gordon | Aug. 9, 1955 |
| 2,771,422 | Browning et al. | Nov. 20, 1956 |
| 2,800,494 | Haluska | July 23, 1957 |
| 2,894,969 | Pierce | July 14, 1959 |
| 2,934,549 | Tarrant et al. | Apr. 26, 1960 |
| 2,961,425 | Pierce et al. | Nov. 22, 1960 |

OTHER REFERENCES

"Development of Fluoro-Silicone, Elastomers," by Paul Tarrant, WADC Technical Report 55–220, August 1955, p. 12.

UNITED STATES PATENT OFFICE
CERTIFICATE OF CORRECTION

Patent No. 3,061,545                                  October 30, 1962

William H. Badger

It is hereby certified that error appears in the above numbered patent requiring correction and that the said Letters Patent should read as corrected below.

Column 5, line 4, strike out "essentially".

Signed and sealed this 3rd day of December 1963.

(SEAL)
Attest:
ERNEST W. SWIDER

EDWIN L. REYNOLDS

Attesting Officer                      Acting Commissioner of Patents